United States Patent [19]

Toscan

[11] 3,804,057
[45] Apr. 16, 1974

[54] SAILBOAT RACING CALCULATOR

[76] Inventor: Richard E. Toscan, 26410 Birchfield Ave., Palos Verdes Peninsula, Calif. 90274

[22] Filed: Oct. 12, 1972

[21] Appl. No.: 296,980

[52] U.S. Cl.................... 116/133, 33/349, 73/180, 116/114
[51] Int. Cl. ............................................. G09f 9/00
[58] Field of Search...... 116/114, 133, 129; 33/349, 33/355, 272; 73/188, 178, 189

[56] References Cited
UNITED STATES PATENTS

| 290,840 | 12/1883 | Blakeslee | 73/180 |
| 2,303,990 | 12/1942 | Dietz | 33/349 |
| 2,824,382 | 2/1958 | Sandberg | 33/355 |
| 3,664,292 | 5/1972 | Sherman | 116/114 R |
| 3,678,591 | 7/1972 | Selig, Jr. | 33/272 |

Primary Examiner—Louis J. Capozi
Attorney, Agent, or Firm—Fulwider, Patton, Rieber, Lee & Utecht

[57] ABSTRACT

A sailboat racing calculator which is mounted on a sailboat adjacent a compass. A compass dial marked with compass bearings is coaxially rotatably supported below a reference disc having windows for viewing the compass markings on the bearing dial. A pair of starboard and port tack arms are pivotally mounted relative to the compass dial and reference disc. The dial and the tack arms are rotatable relative to one another and the disc to permit the sailor to utilize his compass readings as a guide for planning an optimum racing course.

6 Claims, 4 Drawing Figures

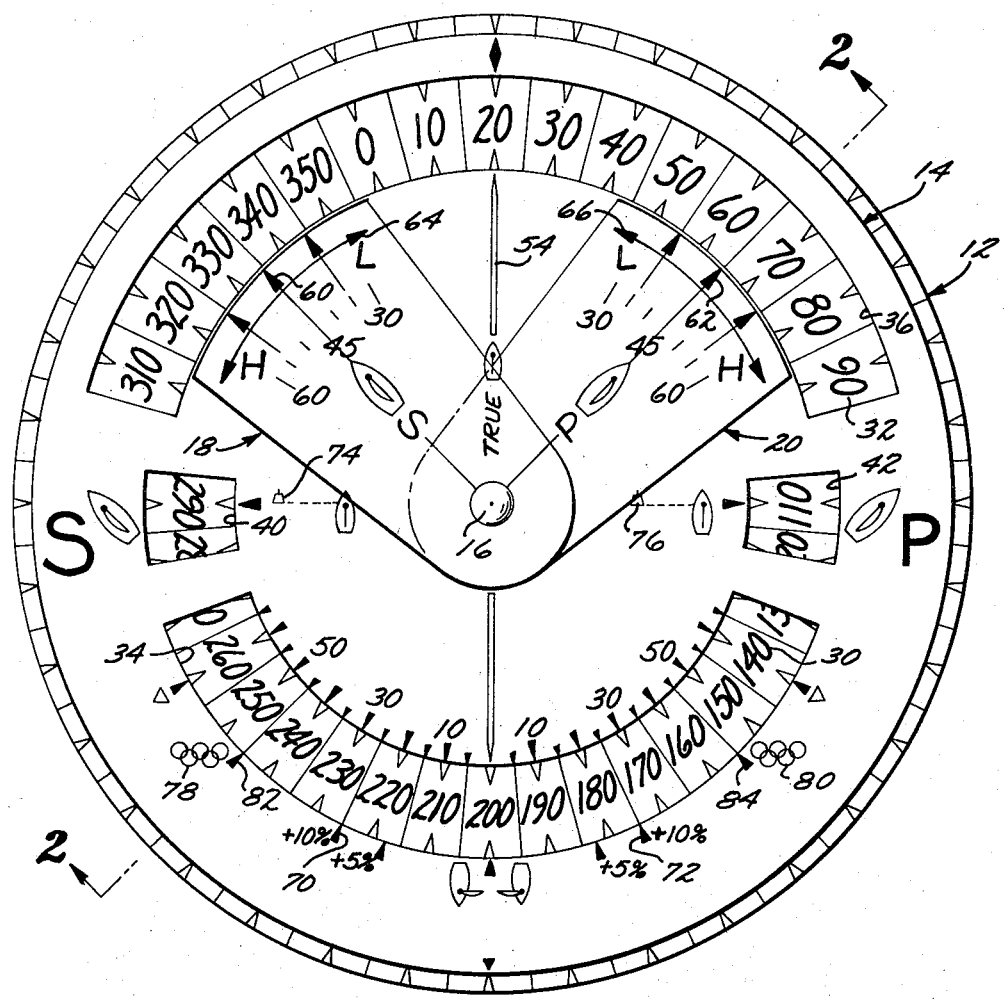
FIG.1
FIG.2
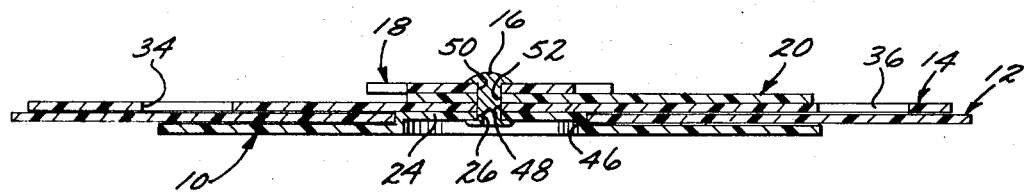

SAILBOAT RACING CALCULATOR

BACKGROUND OF THE INVENTION

1. Field of the Invention

The present invention relates generally to sailboats and more particularly to a novel sailboat racing calculator for use with a compass.

2. Description of the Prior Art

Applicant is not aware of any simple racing calculators usuable with a sailboat compass for providing the sailor with the information needed for optimum competitive sailing, i.e., the favored tack to the windward mark, starboard and port tack headings to windward, the effects of lifts and headers, the initial tack on each off-wind leg, the favored end of the starting line, the preferable downwind tacking angles and Olympic and Gold Cup course headings.

SUMMARY OF THE INVENTION

The racing calculator of the present invention is adapted to be mounted adjacent the compass on a sailboat. The racing calculator includes a compass dial provided with compass bearing markings and which is coaxially rotatable relative to a reference disc. The reference disc is provided with windows through which the indicia on the compass dial may be seen. A pair of starboard and port tack arms are pivotally supported on the axis of rotation of the compass dial relative to the reference disc. By properly manipulating the compass dial and the starboard and port tack arms, the racing sailor is able to utilize his compass to obtain the information needed for competitive sailing. The racing calculator of the present invention is of simple, rugged construction whereby it may be mounted in the cockpit of a sailboat. Additionally, it will provide a long and useful service life.

DESCRIPTION OF THE DRAWINGS

FIG. 1 is a top plan view of a preferred form of sailboat racing calculator embodying the present invention;

FIG. 2 is a vertical sectional view taken on line 2—2 of FIG. 1;

DESCRIPTION OF THE PREFERRED EMBODIMENT

Figure 3:
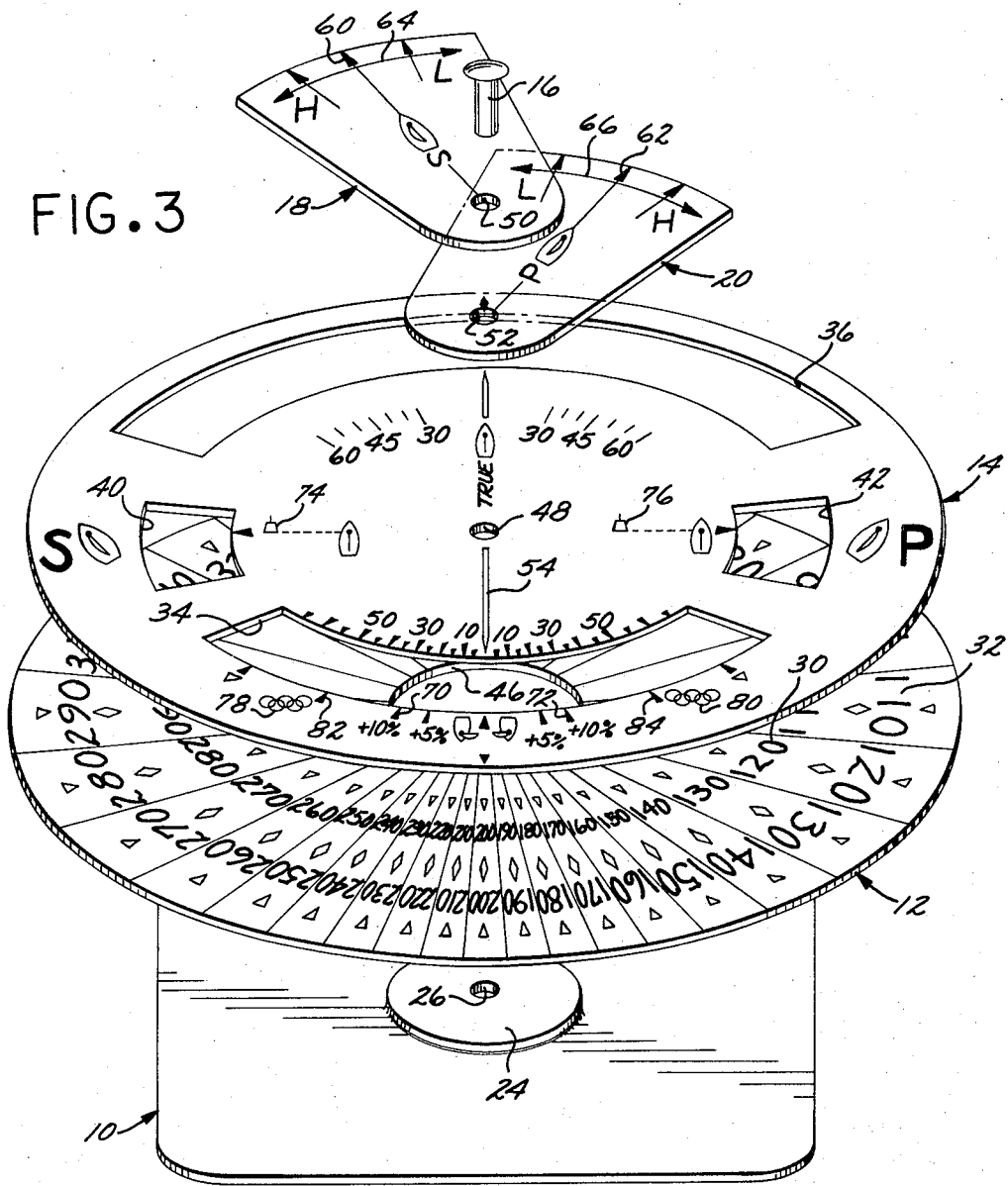
FIG. 3 is a vertically exploded view of said racing calculator.

A preferred form of sailboat racing calculator embodying the present invention includes a backing plate, generally designated 10, upon which is horizontally coaxially supported a compass dial, generally designated 12, and a reference disc, generally designated 14, such dial and discs being affixed to the backing plate by means of a vertical rivet 16. The rivet 16 also pivotally supports a pair of like starboard and port tack arms, generally designated 18 and 20, respectively. The tack arms are positioned above the reference disc 14. The compass dial 12 and port and starboard tack arms 18 and 20 are rotatable relative to one another and to the backing plate 10 and reference disc 14. It should be understood that the backing plate 10 is adapted to be permanently or temporarily affixed to a fixed structural member 22 of a sailboat adjacent a compass (not shown) mounted on such sailboat.

Figure 4:
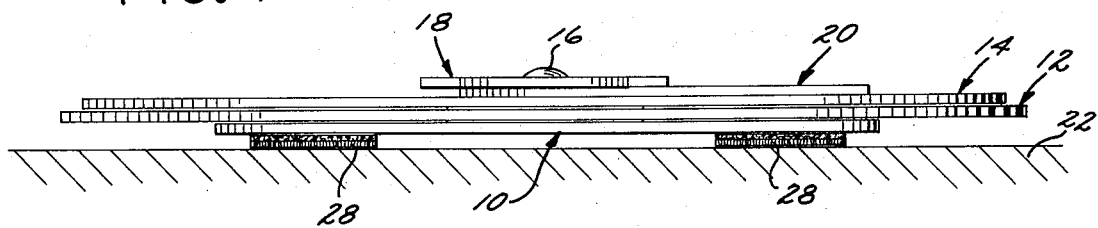
FIG. 4 is a side elevational view of said racing calculator.

More particularly, the backing plate 10 is of generally rectangular construction and is provided at its midportion with a raised annular boss 24. Boss 24 is formed with an aperture 26 which receives the lower portion of the rivet 16. Referring to FIG. 4, a plurality of adhesive pads 28 are interposed between the underside of boss 10 and the boat member 22 so as to temporarily or permanently affix the backing plate to such boat member. The compass dial 12 is provided on its upper surface with an inner and outer row of indicia 30 and 32, respectively, corresponding to the degree markings of a compass. The compass disc 14 is formed at its rear portion with an elongated, annular inner bearing window 34 and at its forward portion with an elongated, annular outer bearing window 36. The intermediate portion of reference disc 14 is provided with a comparatively short starboard line window 40 and a similar, mirror image, port line window 42. The upper surface of reference disc 14 is provided with various indicia which will be described in detail hereinafter.

The starboard and port tack arms 18 and 20 are of like, generally trapezoidal configuration, with their outer edges being arcuate and terminating adjacent the inner edge of the outer bearing window 36 of reference disc 14. The upper surfaces of these arms are provided with indicia to be described hereinafter.

Preferably, the backing plate 10, compass dial 12 and reference disc 14 will be formed of an opaque synthetic plastic material, while the starboard and port tack arms 18 and 20 will be formed of a transparent synthetic plastic material. These plastic materials should be resistant to wear and to water exposure. As indicated particularly in FIG. 2, the midportion of compass dial 12 is formed with a circular opening 46 of slightly larger diameter than the outer diameter of the backing plate boss 24 so that such compass dial is supported upon the backing plate. The midportion of reference disc 14 is formed with an aperture 48 that receives the intermediate portion of rivet 16. Similar apertures 50 and 52 are formed at the inner portion of the starboard and port tack arms 18 and 20 to receive the upper portion of the rivet 16.

In utilizing the aforedescribed racing calculator to determine the favored tack to the windward mark, the reference disc 14 is imprinted with a diametrically extending arrow 54 which bisects such disc. The upper end of the arrow 54 points to the compass bearing indicia in outer indicia row 32 imprinted on compass dial 12, the boat's compass being utilized to obtain such bearing. Thus, referring to FIG. 1, assuming the wind is coming from a direction corresponding to 20° on the compass, the arrow 54 is aligned with the 20 degree indicia on compass dial 12. Next, the compass heading for the first mark is observed on the compass. If such compass heading appears on the starboard side of the arrow 54, a starboard tack to the first mark is favored. Alternatively, if the compass heading for the mark appears on the port (left) of the arrow 54, a port tack to the first mark is favored. By way of example, if the true wind is 20°, as shown in FIG. 1, and the compass heading to the first mark is 30°, a port tack to the first mark is favored. If, however, with the true wind at 20° the heading to the first mark is 10°, a starboard tack to the first mark is favored. The average true wind direction may be found by repeatedly heading the boat directly into the wind and taking readings when the boom is on the center-line of the boat.

Next, if it is desired to measure the sailboat starboard and port tack headings to windward, the starboard and port tack arms 18 and 20 are utilized. It will be noted that the center-line of these arms are each formed with pointers 60 and 62. With the arrow 54 of reference disc 14 again positioned on the average true wind direction indicia of compass dial 12, the pointers 60 and 62 of the starboard and port tack arms are aligned with the bearing indicia on compass dial 12 corresponding to the compass heading the boat follows on a starboard and port tack. Thus, referring to FIG. 1, the pointer 60 of starboard tack arm 18 is aligned with a bearing indicia 45 on reference disc 14 while the pointer 62 of port tack arm 20 is aligned with bearing indicia 45. This indicates that the boat is tacking approximately 45° off the true wind. Keeping this fact in mind, if during a race the boat fails to tack through approximately 45°, the skipper will be apprised of the fact that the boat is not performing normally and he can check the tuning or the wind and wave conditions in an effort to determine the reason for the boat's failure to perform up to its normal standard. In adjusting the tack arms for indicating the starboard and port tack headings to windward, the sailor should repeatedly assume starboard and port tacks in a relatively stable wind.

To determine the effects of lifts and headers, the sailor again utilizes the starboard and port tack arms 18 and 20. In this regard, it will be noted that these arms are provided with circumferentially extending directional arrows 64 and 66, with the ends of such arrows being imprinted with "H" and "L" on the left and right-hand side of the pointer 60 on starboard tack arm 18 and on the right and left-hand side of the pointer 62 of port tack arm 20. Thus, referring again to FIG. 1, and assuming the true wind to be again at 20°, and further assuming the tack arms are still set at 45° off the true wind, should the compass show a starboard tack course of 325° the boat has been headed 10° and the lifted port tack heading will be 55°.

If the sailor wishes to determine the initial tack on each off-wind leg of a racing course, he will carry on starboard tack if the compass heading to the next mark falls on the starboard (S) side of reference disc 14, or on the port side if the compass heading to the next mark falls on the port (P) side of such reference disc. Hence, assuming the compass course to the next mark is 185° and the true wind is again 20°, the sailor will carry on a port tack if he wishes to sail the direct course to the mark. He should mark with a pencil on the surface of reference disc 14 the effective range off the true wind of 20° in which he can carry a spinnaker so as to thereby aid in determing in advance of setting the spinnaker and whether or not such spinnaker should be set after rounding the mark.

It is an important feature of the racing calculator embodying the present invention that the sailor may utilize it to determine the favored end of the starting line. This is accomplished by taking a compass bearing aligning both ends of the starting line with the compass bearing reading then appearing in the starboard or port line window 40 or 42, respectively, depending on which tack the boat was on when bearing was made. If the compass heading to the windward mark appears to the right on the reference disc 14, the starboard end of the line is closer to the first mark. If it appears on the left, however, the port end of the starting line is closer to the first mark. The up-wind end of the starting line is found by using the true wind direction in place of the heading to the first mark. Thus, assume that the port tack bearing on the starting line is 110° and the true wind is 20°, this would indicate that the starting line is perfectly square with the wind. If, however, the port tack bearing on the starting line is 100°, the true wind reading would appear to the right, i.e., port side of the reference disc 12 indicating that the starboard end of the starting line in up-wind.

It is also possible to utilize the racing calculator of the present invention to calculate optimum down-wind tacking angles. The lower portion of the reference disc 14 is imprinted with indicia indicating degrees, starting with zero at the lower end of arrow 54 radially inwardly of the inner bearing window 34. Radially outwardly of the inner bearing window 34 the reference disc is imprinted with port and starboard arrowheads 70 and 72, with the proximate arrowheads bearing the indicia "5 percent" and the remote arrowheads bearing the indicia "10 percent." These indicia show the boat's down-wind course in relation to the true wind. In this manner, there is provided a guide both for tacking downwind and is a check against sailing by the lee. The percentage of extra distance added by sailing above the true down-wind course is shown for up to 25°. Thus, referring to FIG. 1, assuming the true wind is 20°, the compass will read 200° when the boat is running directly downwind. If the boat is then tacked 20° off the direct course, the starboard heading will be 220° and the port heading will be 180°. By tacking in this manner the boat's course will be somewhat over 5 percent longer than that of a boat sailing the direct downwind course.

Finally, the racing calculator embodying the present invention may be utilized to determine Olympic and Gold Cup course headings. To this end, the reference disc 14 is imprinted at its lower left and right-hand portions immediately radially outwardly of the inner bearing window 34 with left and right Gold Cup indicia 74 and 76 and left and right-Olympic indicia 78 and 80. If the compass dial 12 is set to the heading of the windward mark, the symbols 74, 76, 78, or 80 will indicate the compass heading for the off-wind marks. Referring again to FIG. 1, assuming that the heading to the windward mark of a standard Olympic course is 20° and the marks are left to port, headings for the reaching mark will be 245° as indicated at 82 in FIG. 1, and for the downwind mark 155°, as indicated at 84 in FIG. 1. For a 60 degree triangle to port headings will be 260° and 140°, respectively. Where the marks are to starboard the symbols will read first from the right-hand side.

I claim:

1. A sailboat racing calculator for use with a compass, said calculator comprising:

a backing member securable to said sailboat;

a compass dial supported by said backing plate, the upper surface of said dial being provided with indicia corresponding to the degree markings of a compass;

a reference disc rotatably supported upon said compass dial, said reference disc being formed with window means through which may be viewed the indicia on said compass dial, said reference disc also being imprinted with a diametrically extending arrow;

like starboard and port tack arms rotatably supported upon said reference disc on the axis of rotation of said reference disc and formed with pointers;

with said compass dial, reference disc and arms being rotatable independently of one another; and with the arrow of said reference disc and the pointers of said tack arms cooperating with the indicia of said compass dial to provide information relative to the compass headings followed by said sailboat.

2. A sailboat racing calculator as set forth in claim 1 wherein the indicia on said compass dial consists of a radially inner and outer set of compass degree markings and the window means of said reference disc consist of separate inner and outer elongated annular openings respectively aligned with said inner and outer sets of indicia.

3. A sailboat racing calculator as set forth in claim 1 wherein said compass dial and said reference disc are formed of an opaque material and said tack arms are formed of a transparent material.

4. A sailboat racing calculator as set forth in claim 1 wherein the lower portion of said reference disc is provided with indicia showing the sailboat's downward course in relation to the true wind.

5. A sailboat racing calculator as set forth in claim 2 wherein said reference disc is imprinted at its lower left-hand and right-hand portions radially outwardly of said inner bearing window with left and right Gold Cup and Olympic indicia.

6. A sailboat racing calculator for use with a compass, said calculator comprising:

a backing member securable to said sailboat independently of said compasses;

a compass dial rotatably supported by said backing plate, the upper surface of said dial being formed with radially inner and outer sets of indicia corresponding to the degree markings of a compass; and a reference disc rotatably supported upon said compass dial, said reference disc being formed with separate inner and outer elongated annular openings respectively aligned with the inner and outer sets of indicia of said compass dial, said reference disc also being imprinted with a diametrically extending arrow, with the arrow of said reference disc cooperating with the indicia of said compass dial to provide information relative to the compass headings followed by said sailboat.

* * * * *